(12) United States Patent
Hua et al.

(10) Patent No.: US 8,295,030 B2
(45) Date of Patent: Oct. 23, 2012

(54) COMPOSITE MEMBRANE FOR A CAPACITOR

(75) Inventors: Li Hua, Shanghai Pudong New East (CN); Xiao Li Miao, Shanghai Pudong New East (CN); Xiao Lin Chen, Shanghai Pudong New East (CN)

(73) Assignees: Shanghai Aowei Technology Development Co., Ltd., Pudongxinqu, Shanghai (CN); Sinautec Automobile Technologies, L.L.C., Washington, DC (US)

( * ) Notice: Subject to any disclaimer, the term of this patent is extended or adjusted under 35 U.S.C. 154(b) by 668 days.

(21) Appl. No.: 12/325,637

(22) Filed: Dec. 1, 2008

(65) Prior Publication Data

US 2010/0053845 A1 Mar. 4, 2010

(30) Foreign Application Priority Data

Sep. 2, 2008 (CN) .......................... 2008 1 0042585

(51) Int. Cl.
*H01G 9/00* (2006.01)
*H01G 9/02* (2006.01)
(52) U.S. Cl. .................... 361/502; 361/503; 361/512
(58) Field of Classification Search .................. 361/512, 361/502, 503
See application file for complete search history.

(56) References Cited

U.S. PATENT DOCUMENTS

| 5,563,765 | A  | * | 10/1996 | Lian et al. ................ 361/503 |
| 5,585,208 | A  | * | 12/1996 | Lian et al. ................ 429/303 |
| 6,355,375 | B2 |   | 3/2002  | Tanaka et al. |
| 6,911,278 | B2 | * | 6/2005  | Hiroshima et al. .......... 429/524 |
| 7,662,517 | B2 | * | 2/2010  | Lee et al. ................ 429/247 |
| 2009/0086409 | A1 | * | 4/2009 | Kang et al. ................ 361/502 |

FOREIGN PATENT DOCUMENTS

| CN | 1553462 A | 12/2004 |
| CN | 100362676 | 3/2006 |
| CN | 1094063 A | 12/2008 |
| JP | 2001011761 A | 1/2001 |
| JP | 2001222989 A | 8/2001 |

* cited by examiner

*Primary Examiner* — Eric Thomas
*Assistant Examiner* — Arun Ramaswamy
(74) *Attorney, Agent, or Firm* — Connolly Bove Lodge & Hutz LLP

(57) ABSTRACT

A composite membrane for a capacitor, comprising: a carrier; a mixture of a catalytic material for catalyzing hydrogen and oxygen, and a dispersion resin. The catalytic material is selected from the group consisting of a precious metal in Group VIII of the periodic table of elements and their alloys, and a rare earth metal of the La group of rare earth metals and their alloys. The carrier is a film formed by at least one of the following: polypropylene, polyethylene, polytetrafluoroethylene and polyamide. The carrier can include asbestos fibers, polypropylene fibers, or their mixture. The dispersion resin can be one of the following: ethylene, Nafion™, polyvinyl alcohol, polyethylene, CMC, and the like. The present disclosure also provides a method for making a composite membrane, and a capacitor with the composite membrane.

5 Claims, 1 Drawing Sheet

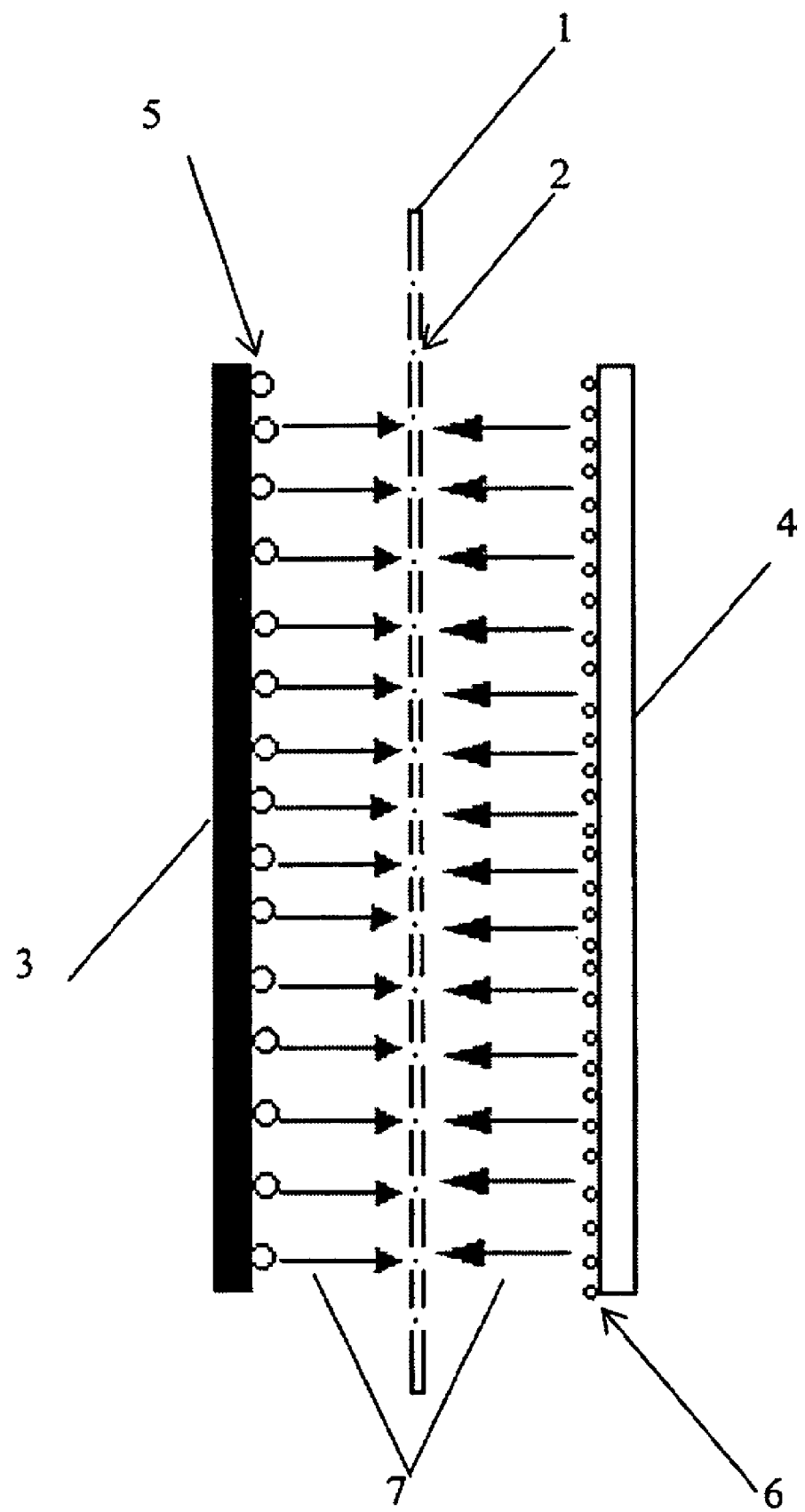

COMPOSITE MEMBRANE FOR A CAPACITOR

CROSS-REFERENCE TO RELATED APPLICATIONS

This Nonprovisional application claims priority under 35 U.S.C. §119(a) on Patent Application No(s). 200810042585.8 filed in the People's Republic of China on Sep. 2, 2008, the entire contents of which are hereby incorporated by reference.

TECHNICAL FIELD

The present disclosure relates to a composite membrane for capacitors and methods of manufacturing such membranes, and capacitors using such membranes. In particular, it relates to a composite membrane for asymmetric supercapacitors having an anode and cathode made of different materials, methods of manufacturing such membranes, and capacitors using such composite membranes. Capacitors with such composite membranes can be used in electric vehicles, electrically-powered devices, and other related technologies in the field to provide an energy-saving and environmentally-friendly power source.

BACKGROUND

Capacitors such as supercapacitors (also known as ultracapacitors) have found increasing use in electric vehicles and the like, using a charge-discharge process that provides electrical-powered vehicles with an energy-saving and environmentally-friendly solution. They also can be used in related technologies for electric-powered devices.

With continued urbanization, awareness of the need for environmental protection also has increased. As part of urban transportation, vehicles powered by chemical batteries are widely used because they create less pollution than vehicles powered by internal combustion. Because supercapacitors have electrical storage capacities of many Farads, they have been used successfully in electric vehicles, hybrid vehicles, and the like. In many electric vehicles, the electrochemical supercapacitors that are used as a power supply are asymmetrical in structural design. The anode and cathode of the supercapacitor are made of different materials. For example, the anode of the supercapacitor may be made of metal oxides, while the cathode of the supercapacitor may be made of activated carbon materials. For such a supercapacitor, on the one hand, the use of an anode of secondary batteries, such as a nickel hydroxide electrode, ensures that the supercapacitor has a high energy density (energy per unit weight). On the other hand, the use of a double-layer cathode (carbon) of ultra-long life cycle (cycles>$10^5$), can enable such supercapacitors to sustain a long-term life of as much as 8-10 years.

A supercapacitor includes an anode, a cathode, an electrolyte, a membrane, and other components. Supercapacitor membranes play a vital role in the performance of supercapacitors. The membranes separate the anode and cathode to prevent direct electrical conduction, while also allowing ions to move freely through the membrane to form a current loop cycle or circuit. In addition, the membrane also has to provide good hydrophilic performance, liquid absorption capacity, air permeability, a sufficient degree of mechanical strength, and anti-chemical and electrochemical corrosion properties. Currently, supercapacitors use a variety of different membranes to provide these properties.

Asymmetrical supercapacitors for electric vehicles, hybrid power vehicles, and other applications are usually designed to work in over-charge/discharge mode to maximize the system's energy density. However, a consequence of operating in a long-term over-charge/discharge mode is an increase in internal pressure caused by the internal accumulation of hydrogen and oxygen gas produced by the supercapacitors. The increased pressure results in the safety valve of the supercapacitor remaining open all the time. The problem this condition creates is that (1) the supercapacitor system can only be used in a valve-regulated mode, which requires electrolytes to be added on a regular basis so that the supercapacitor cannot be used maintenance-free, and (2) the long-term over-charge/discharge state accelerates the degradation of the activated material in the supercapacitor anode, reducing the life cycle of the supercapacitor. During operation, a large volume of gases accumulates at the positive and negative electrodes around the supercapacitor membrane, thereby reducing the efficiency of the supercapacitor. Although this situation creates favorable conditions for combining the hydrogen and oxygen gas to reduce the internal pressure, known membranes are not able to catalyze or otherwise promote the combination of hydrogen and oxygen.

Accordingly, a process is needed that can cause the accumulated hydrogen and oxygen in a supercapacitor to combine to form water, thereby reducing the pressure in the supercapacitor and increasing supercapacitor efficiency.

BRIEF SUMMARY

The present disclosure provides a composite membrane for a supercapacitor and its method of manufacture, as well as a supercapacitor using such membrane. The composite membrane promotes the combination of hydrogen and oxygen that is produced by the supercapacitor and that accumulates inside the supercapacitor to produce water that is absorbed in the electrolyte. This reduces pressure inside the supercapacitor, removes the hazards associated with increased pressure inside the supercapacitor, and reduces the usage of electrolyte in the supercapacitor. By reducing pressure inside the supercapacitor, the present disclosure also permits the complete enclosure of supercapacitors and their components.

The composite membrane can effectively promote the rapid combination of hydrogen and oxygen produced by supercapacitors, especially in electric vehicles such as electric buses, electric cars, and hybrid vehicles that operate under high power and high load conditions. It also can increase the precipitation potential of hydrogen and oxygen as water and raise the electrochemical potential window of supercapacitors during operation to improve the available energy density of the supercapacitor system.

According to another aspect of the present disclosure, a method of making a composite membrane of a supercapacitor includes making a composite membrane from a carrier and a mixture of a catalytic material for catalyzing the combination of hydrogen and oxygen and a dispersion resin.

A composite membrane of the present disclosure includes a catalytic material is selected from the group consisting of a precious metal in Group VIII of the periodic table of elements, and their alloys, and rare earth metals of the La group of rare earth metals and their alloys. Precious metals of Group VIII include platinum (Pt), iridium (Ir), osmium (Os), palladium (Pd), rhodium (Rh), ruthenium (Ru), nickel (Ni), cobalt (Co), and iron (Fe) can be used as catalytic materials in the present disclosure. La group rare earth metals include lanthanum (La), cerium (Ce), praseodymium (Pr), neodymium (Nd), promethium (Pm), samarium (Sm), europium (Eu), gadolinium (Gd), terbium (Tb), dysprosium (Dy) holmium (Ho), erbium (Er), thulium (Tm), ytterbium (Yb), lutetium (Lu), and yttrium (Y) may be used as catalytic materials.

The carrier of the supercapacitor membrane comprises a film formed from one or more of the following: polypropylene, polyethylene, Teflon®, or polyamide. The carrier also can include an asbestos fiber, a polypropylene fiber, or a combination of the two fiber materials.

In the above-mentioned composite membrane, the dispersion resin includes at least one of the following: poly(ethylene oxide), Nafion™, polyvinyl alcohol, or polyethylene CMC (carboxymethylcellulose).

According to another aspect of the disclosure, a method of manufacturing a composite membrane includes the steps of: adding a catalytic material for promoting the combination of oxygen and hydrogen and a dispersion resin into a solvent to form a mixture (step (a)); stirring the catalytic material and resin mixture (step (b)); and placing the mixture onto the carrier by a process that can include impregnation, spraying, and sputtering (step (c)).

The step of adding a catalyst and a dispersion resin to a solvent to form a mixture can include mixing a polyethylene oxide and 10 wt. % Pt/C (carbon supported platinum nanoparticles) into a solvent such as acetonitrile to form a mixture. The mixture is maintained at a temperature of about 60° C. to about 80° C. The mixture is placed into a sealed container and an inert gas is added to the sealed container. The step of stirring the catalytic material and resin mixture can include the step of continually stirring the mixture in the sealed container with the inert gas to form a solution mixture. The step of placing the mixture onto a membrane includes the step of soaking a polypropylene membrane in the solution mixture, removing the polypropylene membrane from the solution mixture, and drying the membrane to form the composite membrane.

In the above-mentioned composite membrane manufacturing method, a magnetic stirrer can be used to stir the solution mixture. The content of poly(ethylene oxide) is 8-10 grams; the content of the 10 wt. % platinum/carbon is 170-190 mg; and the content of the acetonitrile solvent is 400-800 ml. In the above-mentioned composite manufacturing method, the Pt/C materials can be replaced by Pt—Ru/C materials, or the Pt/C materials can be replaced by $LaNi_5$-type hydrogen storage alloy materials.

In the above-mentioned composite membrane manufacturing method, step (a) includes dispersing a cationic 5 wt. % proton curing exchange membrane resin and a 10 wt. % Pt/C in isopropyl alcohol solvent to make a mixture. Step (b) includes stirring the mixture to form a slurry mixture. Step (c) includes spraying the slurry mixture onto both sides of a polypropylene membrane and drying it to form the composite membrane.

In the above-mentioned composite membrane manufacturing method, the step of stirring the catalyst and resin mixture in a solvent can be performed by an ultrasound stirrer that stirs the mixture.

In the above-mentioned composite membrane manufacturing method, the content of the cationic 5 wt. % proton curing exchange membrane resin is 8-12 grams, the content of 10 wt. % Pt/C catalyst is 190-210 mg, and the content of isopropyl alcohol solvent is 280-320 ml.

In the composite membrane manufacturing method, a cationic 5 wt. % proton exchange membrane resin can be replaced by a 10 wt. % anionic resin solution.

According to a further aspect of the disclosure, a capacitor can be provided that includes an anode, a cathode which is positioned in a relatively opposite position to the anode, an electrolyte that is placed between the anode and cathode, and a composite membrane is positioned between the anode and cathode.

The composite membrane for the supercapacitor for vehicles and other electric-powered devices of the invention not only reduces the maintenance of such supercapacitors, but also increases the energy density of the supercapacitor system, thus improving the comprehensive performance of the supercapacitor.

BRIEF DESCRIPTION OF THE DRAWING

The various features and advantages of the disclosure will be more readily understood by consideration of the following detailed description, taken in conjunction with the accompanying drawing in which:

FIG. 1 depicts an asymmetric supercapacitor.

DETAILED DESCRIPTION

In accordance with the present disclosure and its implementation, the content and technical characteristics of this disclosure are further illustrated, but the disclosure is not limited to the particular implementations and examples described herein.

A composite membrane according to an aspect of the disclosure includes: a carrier; and a mixture of a catalytic material for catalyzing the combination of hydrogen and oxygen; and a dispersion resin. In one exemplary implementation, the catalyst is chosen from at least one of the following materials: precious metals in Group VIII of the periodic table of elements and their alloys; and rare earth metals of the La Group and their alloys. Persons skilled in the art will understand that the amount of such precious metals or rare earth elements used in such alloys can vary depending on the application.

The precious metals of Group VIII, which include platinum (Pt), iridium (Ir), osmium (Os), palladium (Pd), rhodium (Rh), ruthenium (Ru), nickel (Ni), cobalt (Co), and iron (Fe), can be used as catalysts with the composite membrane. In addition, the La group rare earth metals, which include lanthanum (La), cerium (Ce), praseodymium (Pr), neodymium (Nd), promethium (Pm), samarium (Sm), europium (Eu), gadolinium (Gd), terbium (Tb), dysprosium (Dy) holmium (Ho), erbium (Er), thulium (Tm), ytterbium (Yb), lutetium (Lu), and yttrium (Y), can be used as catalysts with the composite membrane. Alloys of these metals can be used as catalysts, as well.

In addition, the carrier comprises a film formed from at least one of the following: a polypropylene, a polyethylene, a Teflon®, or a polyamide material. The carrier also can include asbestos fiber, polypropylene fiber, or their mixture. The above-mentioned dispersion resin includes at least one of the following materials: poly(ethylene oxide), Nafion™, polyvinyl alcohol, and polyethylene CMC.

A manufacturing method for the composite membrane includes: forming a mixture of a catalytic material for catalyzing the composition of oxygen and hydrogen and a dispersion resin in a solvent (step (a)); continually stirring the mixture formed in step (a) to form a solution mixture (step (b)); and placing the mixture onto a carrier by impregnation, spraying, or sputtering the mixture onto the carrier (step (c)) to make the composite membrane. In addition, cellulose can be added to the solution mixture, using a method of separating, stretching, or papermaking to make the composite membrane.

To make a supercapacitor system according to an aspect of the disclosure, an anode and the composite membrane are assembled with a cathode to make a battery cell. The cells are connected in parallel combination, filled with an electrolyte, and sealed to make an asymmetric supercapacitor cell. If multiple supercapacitors are connected in series or in parallel combination to form modules, the supercapacitor modules can be used to power electric vehicles and hybrid power vehicles.

FIG. 1 shows an arrangement of an asymmetric supercapacitor that includes a composite membrane of the disclosure. The supercapacitor includes an anode 3 made for example of a metal oxide (such as a nickel hydroxide), a cathode 4 made for example of an activated carbon. An electrolyte is added to the supercapacitor between the anode 3 and the cathode 4. A composite membrane 1 made by one of the methods described herein is placed between the anode 3 and cathode 4. During operation, the anode 3 and cathode 4 produce oxygen 5 and hydrogen 6, respectively. The oxygen 5 and hydrogen 6 move from the anode 3 and cathode 4 toward the composite membrane 1, as shown by the arrows 7 in FIG. 1 and collect at the membrane 1. The composite membrane 1 separates the anode 3 from the cathode 4 of the supercapacitor to prevent direct electrical conduction, but allows ions in the electrolyte to pass through the membrane 1 freely to form a current loop cycle for the supercapacitor. In addition, the membrane 1 provides good hydrophilic properties and performance characteristics. It provides liquid absorption capacity, air permeability, and a certain degree of mechanical strength, and anti-chemical and electrochemical corrosion features. The composite membrane 1 also catalyzes the oxygen and hydrogen that collect around the membrane 1 to produce water that is absorbed into the electrolyte. The composite membrane 1 acts as a catalyst to cause the hydrogen and oxygen in the supercapacitor to combine and form water in the supercapacitor. In this way, the large quantity of oxygen 5 that is produced at the anode 3 and the large quantity of hydrogen 6 that is produced at the cathode 4, and that collect around the composite membrane 1, are catalyzed by the composite membrane 1 to form water, which is absorbed into the electrolyte. The catalytic combination of hydrogen and oxygen to form water maintains the concentration of the electrolyte and the stability of the electrolyte performance. At the same time, it reduces the inner pressure of the entire closed supercapacitor system to ensure the safety of the entire supercapacitor system. The following examples provide several exemplary implementations of the composite membrane of this disclosure.

EXAMPLE 1

In a sealed stirrer such as a magnetic stirrer, add poly (ethylene oxide), 10 wt. % Pt/C (such as carbon-supported platinum nanoparticles produced by Johnson Matthey) into an acetonitrile solution to form a mixture. The content of the poly(ethylene oxide) is 6-15 grams, preferably 8-10 grams, and most preferably 9 grams. The content of the 10 wt. % Pt/C is 150-210 mg, preferably 170-190 mg, and most preferably 180 mg. The acetonitrile solution is 200-1000 ml, and preferably 400-800 ml. The temperature of the solution was maintained at about 60° C. to about 80° C. The mixture was placed into a sealed container and an inert gas was added to the sealed container. The mixture was continually stirred for at least 18 hours under protection of the inert gas until the mixture gets into solution. Then, the solution was transferred to a glass container. A polypropylene membrane (such as Celgard™) was placed in the container and soaked in the solution mixture for 1-2 hours. Then, the membrane was removed from the container and placed in a vacuum drying oven for drying. A composite membrane of a thickness of 20-40 µm was obtained.

A supercapacitor cell was made with the composite membrane made according to the method described in this example and a high power test was conducted on the cell. Test results showed that compared with a regular membrane, the overcharge potential of the composite membrane could be raised to 1.70-1.80 V based on the same current density (the current per unit area). The working electrochemical potential window also was expanded by 100-200 mV, and the energy density was increased by 20-30%.

EXAMPLE 2

In another example, an ultrasound stirrer was used to stir the solution mixture. A dispersion resin such as a cationic 5 wt. % proton curing exchange membrane resin (such as Nafion™ produced by DuPont Company) and 10 wt. % Pt/C catalyst (such as carbon-supported platinum nanoparticles produced by Johnson Matthey) were mixed in an isopropyl alcohol solvent to make a mixture. The content of the cationic 5 wt. % proton curing exchange membrane resin was 5-15 grams, preferably 8-12 grams, and most preferably 10 grams. The content of the 10 wt. % Pt/C catalyst was 150-250 mg, preferably 190-210 mg, and most preferably 200 mg. The content of isopropyl alcohol solvent was 200-400 ml, preferably 280-320 ml, and most preferably 300 ml. The mixture was stirred continually for about 30-60 minutes with an ultrasonic stirrer to form a slurry mixture. The slurry mixture was sprayed onto both sides of a polypropylene membrane (e.g., a membrane produced by Celgard™). The membrane was dried in a vacuum drying oven to form a 20-30 µm-thick composite membrane.

A supercapacitor cell was made with a composite membrane of this example and a high power test was conducted on the cell. The test results show that compared with a regular membrane, the working electrochemical potential window was expanded by 100-200 mV based on the same current density, and the energy density was increased by 10-30%.

EXAMPLE 3

In this example, asbestos fibers, polyvinyl alcohol and 10 wt. % Pt/C (such as carbon-supported platinum nanoparticles produced by Johnson Matthey) were mixed through a wet papermaking method to make a 30-60 µm thick composite membrane. The content of asbestos fibers was 30-75 grams, preferably 40-60 grams, and most preferably 50 grams. The content of polyvinyl alcohol was 1-5 grams, preferably 2-4 grams, and most preferably 3 grams. The content of the 10 wt. % Pt/C was 200-600 mg, preferably 300-500 mg, and most preferably 400 mg.

A supercapacitor cell was made with the composite membrane of this example and a high power test was conducted on the cell. Compared with regular membranes, the test results showed that no obvious gas release was seen when the overcharge potential reached 1.75 V for the composite membrane of this example as compared with a regular membrane under the same test conditions.

EXAMPLE 4

In this example, the conditions were the same as in Example 1, except that the Pt/C catalyst in Example 1 was replaced with a Pt—Ru/C (a carbon-containing platinum ruthenium) catalyst. A composite membrane of similar thickness and performance as in Example 1 was obtained.

EXAMPLE 5

In this example, the conditions were the same as in Example 2, except that only one side of the polypropylene membrane was sprayed with the slurry mixture. The sprayed membrane was hot pressed with a thinner between unsprayed polyethylene or polypropylene membranes to form a composite membrane. The membrane with the Pt/C catalyst sprayed on one side was placed in the middle layer of the composite membrane. The thickness of the resulting composite membrane was 25-50 µm. The performance of this composite membrane was similar to the composite membrane obtained in Example 2.

EXAMPLE 6

In this example, the conditions were the same as in Examples 1 and 4, except that the Pt/C catalyst in Example 1 and the Pt—Ru/C catalyst in Example 4 were replaced with a $LaNi_5$-type hydrogen storage alloy material. In particular, an ultra-fine-$LaNi_5$ hydrogen storage alloy material was used to produce a composite membrane that was 60-100 µm in thickness.

EXAMPLE 7

In this example, the conditions were the same as in Example 2, except that the Nafion™ resin was replaced with a 10 wt. % anionic resin solution. A composite membrane of the same thickness and performance characteristics as in Example 2 was obtained.

EXAMPLE 8

In this example, the conditions were the same as in Example 3, except that the asbestos fibers were replaced with polypropylene fibers. A composite membrane of 20-40 µm thickness was obtained. The performance of the composite membrane was similar to the performance of the membrane obtained in Example 1.

The examples described above disclose the types and quantities of ingredients that were used to prepare composite membranes according to the disclosure. Persons skilled in the art can understand that these examples are intended to disclose various proportional relationships among the disclosed ingredients, but the disclosure is not limited to the specific contents disclosed in the examples. Depending upon the required amount of prepared mixture needed, the content of the ingredients can be increased or decrease proportionally, as long as these ingredients are in a corresponding proportional relationship.

Despite the disclosure of illustrative examples carried out according to various aspects of the disclosure, persons skilled in the art will understand and appreciate that changes can be made to these examples without departing from the spirit or principles of the disclosure.

The invention claimed is:

1. A composite membrane for a supercapacitor, comprising:
   a carrier; and
   a mixture comprising a catalytic material and a dispersion resin, wherein the catalytic material is capable of catalyzing accumulated hydrogen and oxygen in a supercapacitor to combine to form water, thereby reducing the pressure in the supercapacitor and increasing supercapacitor efficiency; and
   wherein the mixture is applied to the carrier to form the composite membrane having a thickness of about 10-100 µm, and further wherein the catalytic material is a precious metal in Group VIII selected from the group consisting of platinum (Pt), iridium (Ir), osmium (Os), palladium (Pd), rhodium (Rh), ruthenium (Ru), cobalt (Co), and iron (Fe), and alloys thereof, or a rare earth metal of the La group selected from the group consisting of praseodymium (Pr), neodymium (Nd), promethium (Pm), samarium (Sm), europium (Eu), gadolinium (Gd), terbium (Tb), dysprosium (Dy) holmium (Ho), erbium (Er), thulium (Tm), ytterbium (Yb), and lutetium (Lu), and their alloys.

2. The composite membrane of claim 1, wherein the carrier comprises a film formed by at least one of the following: polypropylene, polyethylene, polytetrafluoroethylene or polyamide.

3. The composite membrane of claim 1, wherein the carrier comprises an asbestos fiber, a polypropylene fiber, or a mixture of an asbestos fiber and a polypropylene fiber.

4. The composite membrane of claim 1, wherein the dispersion resin comprises at least one of the following: poly (ethylene oxide), a cationic 5 wt. % proton curing exchange membrane resin, polyvinyl alcohol, or polyethylene CMC.

5. A supercapacitor comprising:
   an anode;
   a cathode positioned apart from the anode;
   an electrolyte disposed between the anode and the cathode; and
   a composite membrane made according to claim 1 arranged between the anode and cathode.

* * * * *